US011425208B2

(12) United States Patent
Seward (10) Patent No.: US 11,425,208 B2
(45) Date of Patent: *Aug. 23, 2022

(54) MESSAGE DELIVERY BASED ON SUBSETS OF NETWORK IDENTITIES

(71) Applicant: T-Mobile USA, Inc., Bellevue, WA (US)

(72) Inventor: Shelby Seward, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/153,034

(22) Filed: Jan. 20, 2021

(65) Prior Publication Data

US 2021/0144215 A1    May 13, 2021

Related U.S. Application Data

(63) Continuation of application No. 14/793,035, filed on Jul. 7, 2015, now Pat. No. 10,904,343.

(51) Int. Cl.
| | |
|---|---|
| *H04L 67/146* | (2022.01) |
| *H04M 3/42* | (2006.01) |
| *H04W 8/18* | (2009.01) |
| *H04L 65/1016* | (2022.01) |
| *H04L 65/1073* | (2022.01) |

(Continued)

(52) U.S. Cl.
CPC ........ *H04L 67/146* (2013.01); *H04L 65/1016* (2013.01); *H04L 65/1073* (2013.01); *H04M 3/42161* (2013.01); *H04W 8/18* (2013.01); *H04L 51/00* (2013.01); *H04M 7/0012* (2013.01); *H04M 2207/18* (2013.01)

(58) Field of Classification Search
CPC .............. H04L 67/146; H04L 65/1016; H04L 65/1073; H04L 51/00; H04L 51/28; H04L 51/36; H04M 3/42161; H04M 2207/18; H04M 7/0012; H04W 8/18

See application file for complete search history.

(56) References Cited

U.S. PATENT DOCUMENTS

| | | |
|---|---|---|
| 2008/0176538 A1 | 7/2008 | Terrill et al. |
| 2009/0061872 A1 | 3/2009 | Hicks |

(Continued)

OTHER PUBLICATIONS

Jenning, et. al., "Managing Client-Initiated Connections in the Session Initiation Protocol (SIP)", Oct. 2009, Request for Comments, 50 pages.

(Continued)

*Primary Examiner* — Brian Whipple
*Assistant Examiner* — James Ross Hollister
(74) *Attorney, Agent, or Firm* — Lee & Hayes, P.C.

(57) ABSTRACT

User devices configured to select subsets of network identities and network devices configured to deliver messages based on those subsets are described herein. The user devices each receive multiple network identities for a service account, select a subset of the network identities based on preferences, and provide the selected subset to the telecommunication network in message headers. The preferences indicate network identities for which a user wishes the user device to receive communications. A network device receives and caches the subsets. The network device further utilizes the subsets in determining which user device to deliver messages to.

20 Claims, 7 Drawing Sheets

(51) Int. Cl.
   *H04L 51/00*   (2022.01)
   *H04M 7/00*   (2006.01)

(56) References Cited

U.S. PATENT DOCUMENTS

| | | | |
|---|---|---|---|
| 2009/0098853 A1 | 4/2009 | Mutikainen et al. | |
| 2009/0150562 A1* | 6/2009 | Kim | H04L 65/1063 709/238 |
| 2009/0191869 A1 | 7/2009 | Siegel et al. | |
| 2009/0191871 A1* | 7/2009 | Siegel | H04L 65/1073 455/435.1 |
| 2010/0046731 A1 | 2/2010 | Gisby et al. | |
| 2011/0026704 A1 | 2/2011 | Connelly et al. | |
| 2011/0202600 A1* | 8/2011 | Ramamoorthy | H04L 67/02 709/203 |
| 2012/0033610 A1* | 2/2012 | Ring | G06Q 20/14 370/328 |
| 2012/0166652 A1* | 6/2012 | Bouthemy | H04L 65/1083 709/227 |
| 2013/0084860 A1 | 4/2013 | Wong et al. | |
| 2014/0068710 A1 | 3/2014 | Lau et al. | |
| 2014/0179309 A1* | 6/2014 | Eichen | H04L 65/1073 455/433 |
| 2015/0312281 A1* | 10/2015 | Martinez | H04L 65/1016 709/228 |
| 2016/0352855 A1 | 12/2016 | Sharma et al. | |
| 2017/0013024 A1 | 1/2017 | Seward | |
| 2017/0214534 A1 | 7/2017 | Rivas Molina et al. | |

OTHER PUBLICATIONS

Jesske, et. al., "Private Header (P-Header) Extentions to the Session Initiation Protocol (SIP) for the 3GPP" Jul. 2014, Request for Comments, 43 pages.

Office Action fo U.S. Appl. No. 14/793,035, dated Mar. 9, 2020, Seward, "Message Delivery Based on Subsets of Network Identities", 44 Pages.

Final Office Action dated Mar. 19, 2019 for U.S. Appl. No. 14/793,035 "Message Delivery Based on Subsets of Network Identities" Seward, 35 pages.

Office Action for U.S. Appl. No. 14/793,035, dated Mar. 12, 2018, Seward, "Message Delivery Based on Subsets of Network Identities" 41 pages.

Office Action for U.S. Appl. No. 14/793,035, dated Aug. 22, 2019, Seward, "Message Delivery Based on Subsets of Network Identities", 54 pages.

Office Action for U.S. Appl. No. 14/793,035, dated Aug. 23, 2017, Seward, "Message Delivery Based on Subsets of Network Identities" 26 pages.

Office Action for U.S. Appl. No. 14/793,035, dated Sep. 6, 2018, Seward, "Message Delivery Based on Subsets of Network Identities" 42 pages.

* cited by examiner

MESSAGE DELIVERY BASED ON SUBSETS OF NETWORK IDENTITIES

CROSS REFERENCE TO RELATED APPLICATIONS

This is a continuation application which claims priority to commonly assigned, U.S. patent application Ser. No. 14/793,035, filed Jul. 7, 2015. Application Ser. No. 14/793,035 is fully incorporated herein by reference.

BACKGROUND

Increasingly, users have multiple telecommunication devices that they use to engage in communication. Such devices may include cellular phones, tablet computers, laptops, and many other devices. Each device may have its own communication address, such as a phone number, and may receive communications directed to any communication address associated with a service account. One enabling technology for this service, call forking, may be implemented in a telecommunication network utilizing an Internet Protocol (IP) Multimedia Subsystem (IMS). In IMS, call forking may be achieved through implicit registration sets (IRS). With IRS, when any one network identity (e.g., IP Multimedia Public Identifier (IMPU)) associated with a communication address is registered, other network identities associated with a same service account as that network identity are also registered. Then, when a communication is received and directed to any one network identity of the registration set, it may be sent to all network identities of that registration set.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, user devices configured to select subsets of network identities and telecommunication network devices configured to deliver messages based on those subsets. The user devices each receive multiple network identities for a service account. Such identities may be received from an account information server or from a telecommunication device in SIP registration response message(s). The user devices then each select a subset of the network identities based on user preferences. Such user preferences may indicate network identities for which a user wishes the user device to receive communications. The user devices then provide their respective selected subsets to the telecommunication network in message headers, such as private headers of SIP registration or re-registration message(s). The subsets may each specify network identities included in that subset or network identities not included in that subset. Further, the user devices may provide a subset of the network services available for a network identity to the telecommunication network.

In various implementations, a telecommunication network device receives and caches the subsets. Upon receiving a message directed to a network identity of a plurality of network identities, the telecommunication network device identifies all contact addresses registered against any of the network identities. For each contact address, the telecommunication network device determines whether the network identity is included among a subset of the plurality of network identities received from the user device associated with that contact address. Based on those determinations, the telecommunication network device delivers the message to the user devices which included the network identity in the respective subsets of the plurality of network identities provided by those user devices.

Additionally, an account information server may be configured to provide multiple user devices associated with a service account with communication addresses mapped to those user devices. Different user devices may be mapped to different subsets of the communication addresses for a service account. The provided mappings may reflect preferences provided by a user associated with the service account.

Overview

Figure 1:
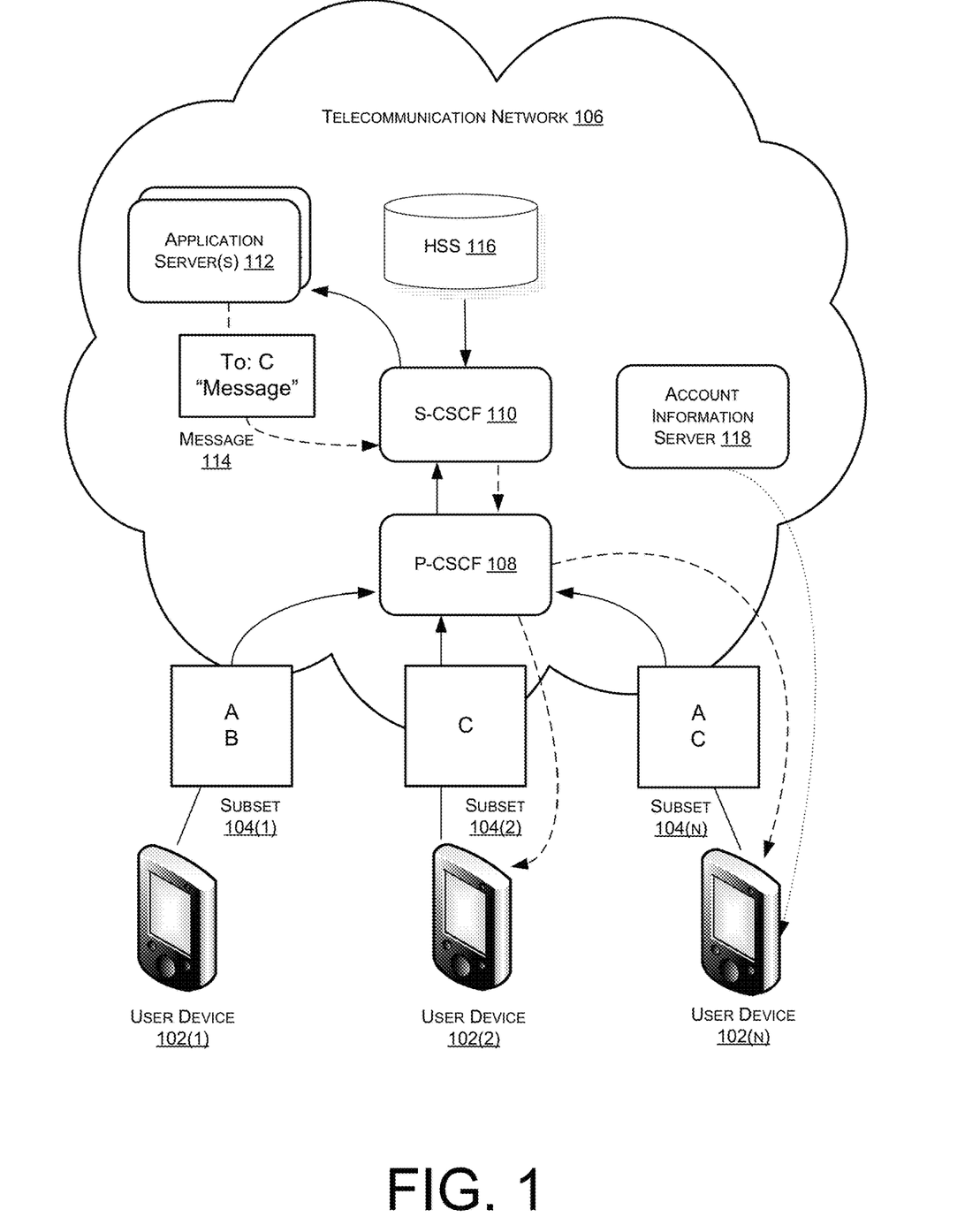
FIG. 1 illustrates an overview and example environment, including user devices providing subsets of network identities and telecommunication network devices delivering messages based on those subsets.

FIG. 1 illustrates an overview and example environment, including user devices providing subsets of network identities and telecommunication network devices delivering messages based on those subsets. As illustrated, user devices 102, such as user device 102(1), user device 102(2) and user device 102(n), provide subsets 104 of network identities, such as subset 104(1), subset 104(2), and subset 104(n) to a telecommunication network 106. The subsets 104 may be received and cached by a telecommunication network device, such as a Proxy Call Session Control Function (P-CSCF) 108, a Serving Call Session Control Function (S-CSCF) 110, or one or more application servers 112. The P-CSCF 108, S-CSCF 110, or application server(s) 112 may utilize the subsets 104 when determining which user devices 102 to deliver a message 114 to. The telecommunication network 106 may also include either or both of a home subscriber server (HSS) 116 or an account information server 118 which may be configured to store and provide the network identities associated with a service account.

Figure 2:
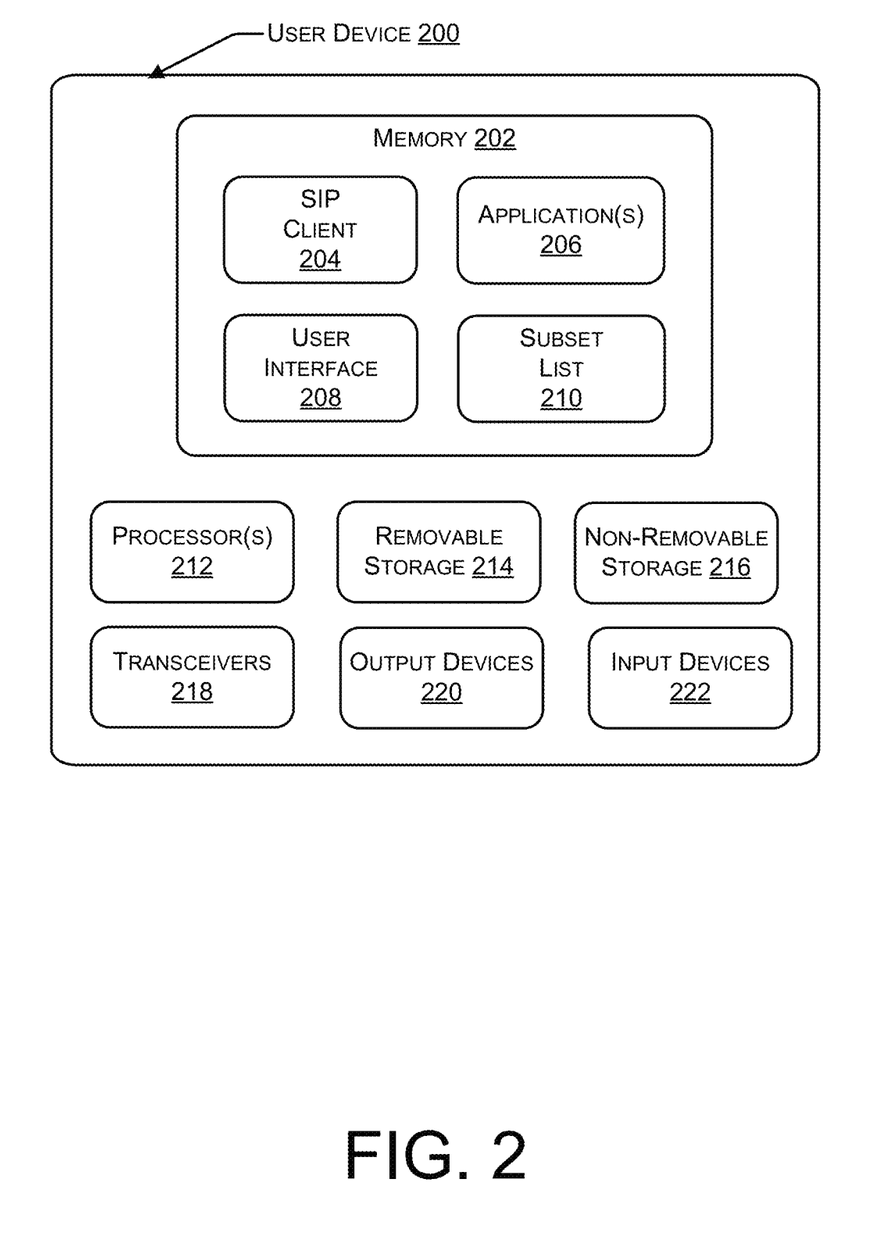
FIG. 2 illustrates a component level view of a user device configured to select a subset of network identities.

In various implementations, the user devices 102 may be any sort of computing device or computing devices, such as cellular phones, tablet computers, laptop computers, wearable computers, media players, personal computers (PCs), work stations, or any other sort of device or devices. Different ones of the user devices 102 may be different types of user devices. For example, user device 102(1) may be a cellular phone (e.g., a smart phone), user device 102(2) may be a tablet computer, and user device 102(n) may be a laptop computer. Each user device 102 may be configured with a Session Initiation Protocol (SIP) client configured to communication with an IMS of the telecommunication network 106. User devices 102 may also store their respective subsets 104 and be configured with application(s) or user interface(s) for generating preferences. The user devices 102 may also each be associated with a single service account. For example, user device 102(1) may be a cellular phone associated with a telecommunication service account, and user device 102(n) may be a laptop computer logged into that service account, either through a website or a downloaded client. An example user device 102 is shown in FIG. 2 and described in greater detail below.

In further implementations, the telecommunication network 106 may be any sort of telecommunication network or networks associated with a telecommunication service provider. Such a telecommunication network 106 may include a core network and multiple access networks associated with multiple locations. The access networks may include cellular networks utilizing Long Term Evolution (LTE), Global System for Mobility (GSM), etc., and WiFi networks or other networks utilizing unlicensed spectrum. The core network may support packet-switched or circuit-switched connections and may include a number of network components. Such components may include a home location register (HLR) or HSS 116 for storing user and device information, as well as IMS components, such as P-CSCF 108 and S-CSCF 110. The components may also include application server(s) 112, such as a telephony application server (TAS) or rich communication service (RCS) server. Further, the telecommunication network 106 may include an account information server 118, which may provide network identities, credentials, and other information to a user device 102.

Figure 3:
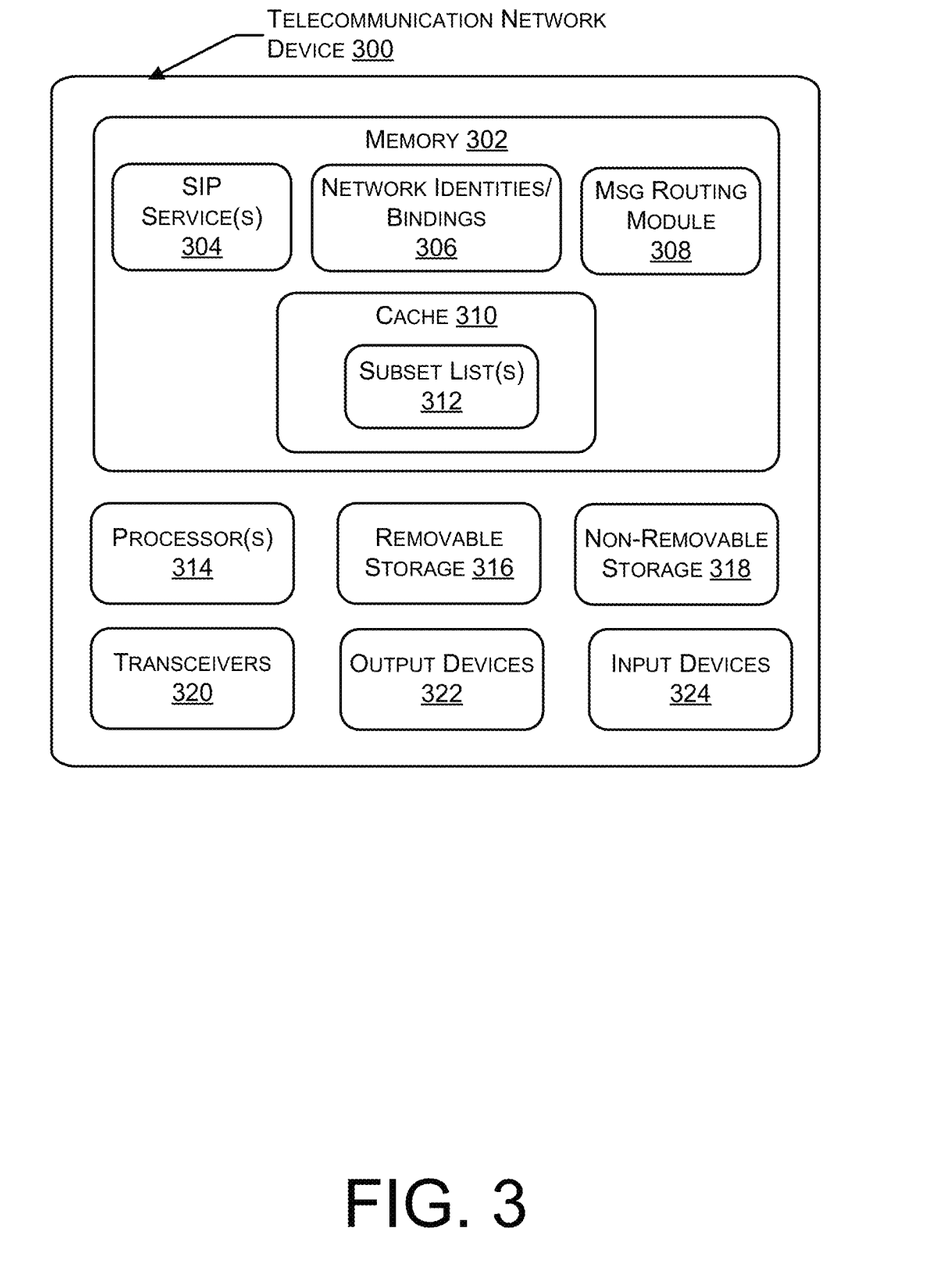
FIG. 3 illustrates a component level view of a telecommunication network device configured to deliver messages to user device(s) based on subset(s) of network identities respectively associated with those user devices.
Figure 4:
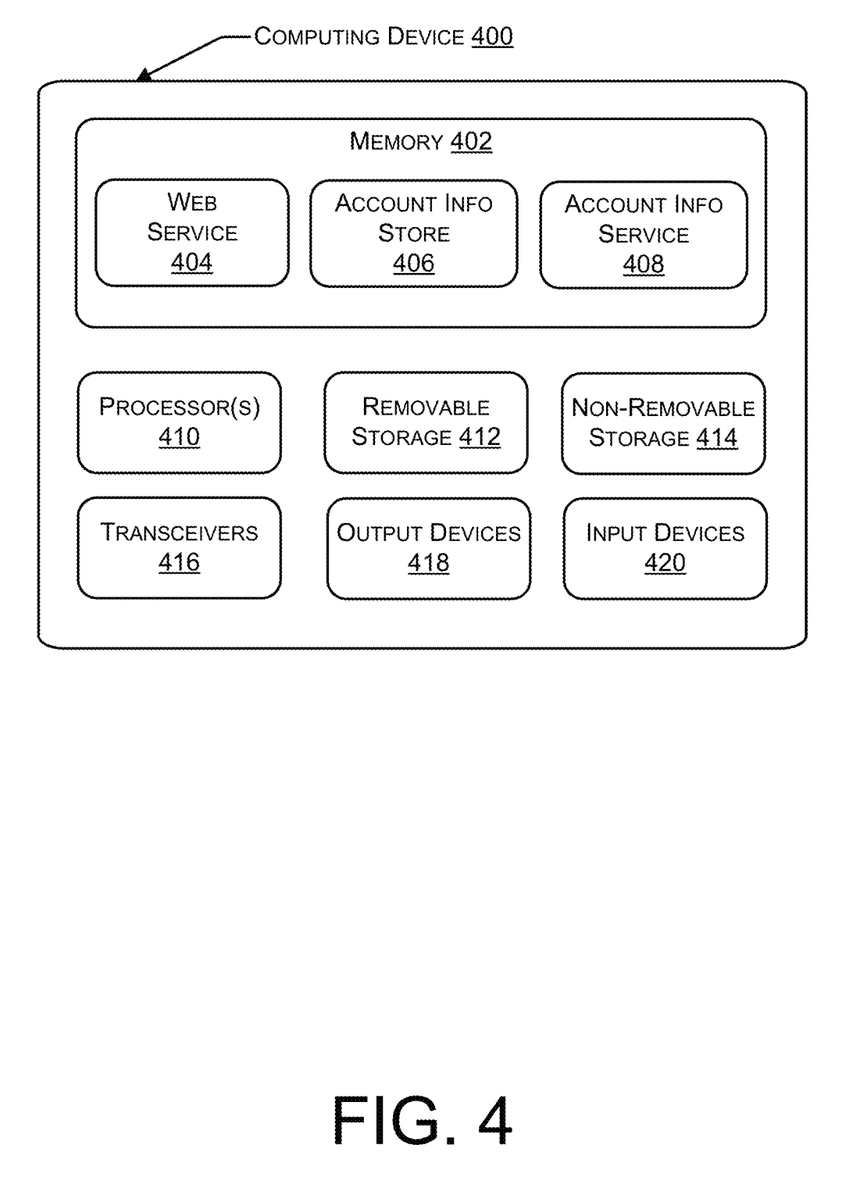
FIG. 4 illustrates a component level view of a computing device configured to store and provide account information, including indications of communication address(es) associated with a user device.

Any of the telecommunication network devices, such as the P-CSCF 108, S-CSCF 110, application server(s) 112, HSS 116, or account information server 118, may be implemented on one or more computing devices. Alternatively or additionally, multiple ones of the telecommunication network devices, such as the P-CSCF 108 and S-CSCF 110 may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud computing network of nodes. An example telecommunication network device (e.g., a P-CSCF 108, a S-CSCF 110, or an application server 112) is illustrated in FIG. 3 and is described in detail below with reference to that figure. An example account information server 112 is illustrated in FIG. 4 and is described in detail below with reference to that figure.

In various implementations, user devices 102 may receive network identities from the telecommunication network 106, as an implicit registration set (IRS), or from the account information server 118 as an IRS or subset of an IRS. The network identities may be IMPUs or other user identities and may each be associated with a communication address, such as a mobile station international subscriber directory number (MSISDN). Such a communication address may be associated with multiple network identities. The network identities and communication addresses may also be associated with a service account, such as an account for services offered by the telecommunication service provider operating the telecommunication network 106. Each service account may be associated with multiple communication addresses, multiple network identities, and multiple user devices 102. For example, each of user device 102(1), user device 102(2), and user device 102(n) may be associated with a single service account. User device 102(1) may be a cellular phone with a subscriber identity module (SIM) associated with the telecommunication service provider, and user device 102(n) may be a laptop computer with an application downloaded from the telecommunication service provider or logged in to the telecommunication service provider.

The user devices 102 may, for example, receive the IRS from the telecommunication network 106 responsive to sending SIP registration message(s) to the telecommunication network 106. The IRS may then be provided to the user devices 102 in SIP registration response message(s), such as 200OK message(s), in message headers, such as P-associated Uniform Resource Identifier (URI) headers. The IRS may be retrieved from the HSS 116 by the S-CSCF 110 and provided to the user devices 102 through the P-CSCF 108. The S-CSCF 110 may retrieve the IRS responsive to receiving the SIP registration message(s).

Additionally or alternatively, the IRS or a subset 104 of the IRS may be stored on the account information server 118 and provided to the user devices 102. If providing a subset 104, the account information server 118 may provide different subsets 104 to different ones of the user devices 102. The IRS or subsets 104 may be received by the user devices 102 from the account information server 118 at any time, even prior to the initiation of any communication session with the IMS of the telecommunication network 106.

The account information server 118 may generate and store subsets 104 of an IRS responsive to preferences received from a user. For example, through a user interface, such as a website, the account information server 118 or other device of the telecommunication network 106 may allow a user to select the communication addresses he or she wishes to receive on each user device 102. In some implementations, the user may even specify network services that the other wishes to receive for a given communication address. For instance, a user may wish to receive all communications to a communication address at user device 102(1) may only receive voice calls to that same communication address at user device 102(2). Alternatively to specifying desired communication addresses or desired network services (e.g., a "whitelist"), the user may specify communication addresses or network services that the user does not wish to receive at a given user device 102 (e.g., a "blacklist"). These network services may be identified using feature tags or IMS communication service identifiers (ICSIs). Based on the user input, the account information server 118 may receive mappings of communication addresses to user devices 102. In some implementations, the mappings may be of one or more network identities associated with each communication address to user devices 102. The account information server 118 may then or later provide to each user device 102 the communication addresses or network identities selected for it. If the user specifies network services for a communication address, the account information server 118 may also store and provide identifications of those network services to the account information server 118.

Once a user device 102 has received an IRS, it may select a subset 104 of that IRS based on user preferences. Those user preferences may in turn be generated based on user input received through a user interface, such as a user interface of a platform component or application of the user device 102. As described above with reference to the account information server 118, the user may indicate via the user interface which communication addresses that the user wishes to use on that user device 102, and may also indicate which network services of a given communication address that the user wishes to receive. Such user preferences may then be stored for future use. As such, they can even be generated in advance of receiving the IRS.

The user device 102 may then select the subset 104 by identifying one or more network identities associated with each communication address specified by the user preferences and either a) selecting those network identities as the subset 104 (e.g., a "whitelist") or b) selecting the not-identified network identities as the subset 104 (e.g., a "blacklist). In some implementations, a SIP client of the user device 102 may perform the selecting. When the user preferences specify preferences for network services, identifiers of the selected or not-selected network services may also be included in the subset 104.

If the user device received a subset 104 from the account information server 118, it may simply use that subset 104 rather than generate user preferences and select a subset 104.

The SIP client of the user device 102 may then provide the subset 104 to the telecommunication network in private header(s) of SIP message(s), such as SIP registration message(s) or SIP re-registration message(s). When the IRS is received in SIP registration response message(s), the subset 104 may be provided in SIP re-registration message(s). When the IRS or a subset 104 is received from an account information server 118, the subset 104 may be provided in SIP registration message(s).

In some implementations, the user devices 102 may also store their respective subsets 104 for future use such that the subsets 104 do not need to be repeatedly generated. The user device 102 may store such subsets 104 locally or remotely.

The subsets 104 are then received by a P-CSCF 108 of the telecommunication network 106 and may be stored locally in cache of the P-CSCF 108 in association with contact addresses used to identify the respective user devices 102. Alternatively or additionally, the subsets 104 may be provided to the S-CSCF 110 and stored locally in cache of the S-CSCF 110 in associated with contact addresses used to identify respect user devices 102. The contact addresses utilized by the S-CSCF 110 may, in some implementations, differ from those used by the P-CSCF 108. Additionally or alternatively, the subsets 104 may be provided to application server(s) 112 and stored locally in cache of the application server(s) 112 in association with contact addresses used to identify the respective user devices 102. The contact addresses utilized by the application server(s) 112 may, in some implementations, differ from those used by the P-CSCF 108, the S-CSCF 110, or both. When provided to the application server(s) 112, the SIP message(s) including the subsets 104 may be provided as attachments to third party registration (TPR) messages sent from the S-CSCF 110 to the application server(s) 112. In some implementations, TPR messages may or may not include an embedded registration element from the P-SCSF 108 based on the inclusion of a subset 104 in a registration message. For a given contact address, if the subset 104 changes due to a refresh registration from a user device 102 associated with that contact address, the S-CSCF 110 may perform a de-register or register with using new TPR message(s) with the application server(s) 112.

In various implementations, the subsets 104 may then be utilized when routing a message 114 to any or all of the user devices 102. Upon receiving a message 114 directed to a network identity associated with a service account, the device storing the subsets 104 (the P-CSCF 108, the S-CSCF 110, or the application server(s) 112) may identify one or more contact addresses registered against any of the network identities associated with that service account. For each contact address, the device may then determine whether the network identity specified by the message 114 is included among the subset 104 received from the user device 102 associated with that contact address. The device may then, based on that determination, deliver the message 114 to the user devices 102 which included that network identity in the respective subsets 104 provided by those user devices 102.

In FIG. 1, the message 114 may be directed to a network identity 'C.' Both the subset 104(2) and the subset 104(n) specify 'C' among the listed network identities, and subset 104(1) does not include 'C.' If the subsets 104 are "whitelists," the message 114 may be delivered to user device 102(2) and user device 102(n). If the subsets 104 are blacklists, the message 114 may be delivered to user device 102(1).

Example Devices

FIG. 2 illustrates a component level view of a user device configured to select a subset of network identities. As illustrated, the user device 200 comprises a system memory 202 storing a SIP client 204, application(s) 206, a user interface 208, and a subset list 210. Also, the user device 200 includes processor(s) 212, a removable storage 214, a non-removable storage 216, transceivers 218, output device(s) 220, and input device(s) 222.

In various implementations, system memory 202 is volatile (such as RAM), non-volatile (such as ROM, flash memory, etc.) or some combination of the two. The SIP client 204 may perform any or all of the receiving of network identities, selecting subset 104, or providing subset 104, as described above. The application(s) 206 or user interface 208 may be utilized to receive user input and generate user preferences, which may then be used by the SIP client 204 to generate a subset 104. Alternatively, the application(s) 206 may also utilize the user preferences to select the subset 104. Subset list 210 may be an example of a subset 104.

In some implementations, the processor(s) 212 is a central processing unit (CPU), a graphics processing unit (GPU), or both CPU and GPU, or any other sort of processing unit.

The user device 200 may also include additional data storage devices (removable and/or non-removable) such as, for example, magnetic disks, optical disks, or tape. Such additional storage is illustrated in FIG. 2 by removable storage 214 and non-removable storage 216.

Non-transitory computer-readable media may include volatile and nonvolatile, removable and non-removable tangible, physical media implemented in technology for storage of information, such as computer readable instructions, data structures, program modules, or other data. System memory 202, removable storage 214 and non-removable storage 216 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 200. Any such non-transitory computer-readable media may be part of the user device 200.

In some implementations, the transceivers 218 include any sort of transceivers known in the art. For example, transceivers 218 may include a radio transceiver that performs the function of transmitting and receiving radio frequency communications via an antenna. The transceivers 218 may facilitate wireless connectivity between the user device 200 and other devices. In addition, the transceivers 218 may also include a wireless communication transceiver and a near field antenna for communicating over unlicensed wireless IP networks, such as local wireless data networks and personal area networks (e.g., Bluetooth® or near field communication (NFC) networks). Further, the transceivers 218 may include wired communication components, such as an Ethernet port, that connect the user device 200 in a wired fashion to other devices.

In some implementations, the output devices 220 include any sort of output devices known in the art, such as a display (e.g., a liquid crystal display), speakers, a vibrating mechanism, or a tactile feedback mechanism. Output devices 220 also include ports for one or more peripheral devices, such as headphones, peripheral speakers, or a peripheral display.

In various implementations, input devices 222 include any sort of input devices known in the art. For example, input devices 222 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of a telecommunication network device configured to deliver messages to user device(s) based on subset(s) of network identities respectively associated with those user devices. The telecommunication network device 300 may be an example of any of the P-CSCF 108, the S-CSCF 110, or an application server 112. As illustrated, the telecommunication network device 300 comprises a system memory 302 storing SIP service(s) 304, network identities/bindings 306, and a message routing module 308. Further, the memory 302 may include a cache memory 310 which may store subset list(s) 312. Also, the computing device 300 includes processor(s) 314, a removable storage 316, a non-removable storage 318, transceivers 320, output device(s) 322, and input device(s) 324.

In various implementations, system memory 302 is volatile (such as RAM), non-volatile (such as ROM, flash memory, etc.) or some combination of the two. SIP service(s) 304 may perform any of the SIP functions of the telecommunication network device 106, including retrieving the network identities from the HSS 116 or a like system with interfaces as defined for an HSS, including, e.g., Sh/Cx interfaces, and providing the network identities to the user devices 102. The network identities/bindings 306 may be used by the message routing module 308 to identify contact addresses, as described above. The message routing module 308 may also store subsets 104, such as subset list(s) 312, in cache 310, receive messages, identify contact addresses, determine whether subsets 104 include the network identity addressed by a received message, and deliver the message based on that determining. While cache 310 is shown as part of system memory 302, it is to be understood that cache 310 may be separate memory.

In some implementations, the processor(s) 314 is a central processing unit (CPU), a graphics processing unit (GPU), or both CPU and GPU, or any other sort of processing unit.

The telecommunication network device 300 may also include additional data storage devices (removable and/or non-removable) such as, for example, magnetic disks, optical disks, or tape. Such additional storage is illustrated in FIG. 3 by removable storage 316 and non-removable storage 318.

Non-transitory computer-readable media may include volatile and nonvolatile, removable and non-removable tangible, physical media implemented in technology for storage of information, such as computer readable instructions, data structures, program modules, or other data. System memory 302, removable storage 316 and non-removable storage 318 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the telecommunication network device 300. Any such non-transitory computer-readable media may be part of the telecommunication network device 300.

In some implementations, the transceivers 320 include any sort of transceivers known in the art. For example, the transceivers 320 may include wired communication components, such as an Ethernet port, for communicating with other networked devices. Also or instead, the transceivers 320 may include wireless modem(s) to may facilitate wireless connectivity with other computing devices. Further, the transceivers 320 may include a radio transceiver that performs the function of transmitting and receiving radio frequency communications via an antenna.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a computing device configured to store and provide account information, including indications of communication address(es) associated with a user device. The account information server 118 may be an example of such a computing device. As illustrated, the computing device 400 comprises a system memory 402 storing a web service 404, an account information store 406, and an account information service 408. Also, the computing device 400 includes processor(s) 410, a removable storage 412, a non-removable storage 414, transceivers 416, output device(s) 418, and input device(s) 420.

In various implementations, system memory 402 is volatile (such as RAM), non-volatile (such as ROM, flash memory, etc.) or some combination of the two. The web service 404 may be utilized to provide a user interface to a user and receive user input indicating user preferences mapping communication addresses to user devices. The account information store 406 may store the mappings, as well as other information utilized by a user device to access services of the telecommunication network 106. The account information service 408 may provide the communication addresses (or network identities) to each user device that are mapped to that user device.

In some implementations, the processor(s) 410 is a central processing unit (CPU), a graphics processing unit (GPU), or both CPU and GPU, or any other sort of processing unit.

The computing device 400 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. System memory 402, removable storage 412 and non-removable storage 414 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 400. Any such non-transitory computer-readable media may be part of the computing device 400.

In some implementations, the transceivers 416 include any sort of transceivers known in the art. For example, the transceivers 416 may include wired communication components, such as an Ethernet port, for communicating with other networked devices. Also or instead, the transceivers 416 may include wireless modem(s) to may facilitate wireless connectivity with other computing devices. Further, the transceivers 416 may include a radio transceiver that performs the function of transmitting and receiving radio frequency communications via an antenna.

In some implementations, the output devices 418 include any sort of output devices known in the art, such as a display (e.g., a liquid crystal display), speakers, a vibrating mechanism, or a tactile feedback mechanism. Output devices 418 also include ports for one or more peripheral devices, such as headphones, peripheral speakers, or a peripheral display.

In various implementations, input devices 420 include any sort of input devices. For example, input devices 420 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
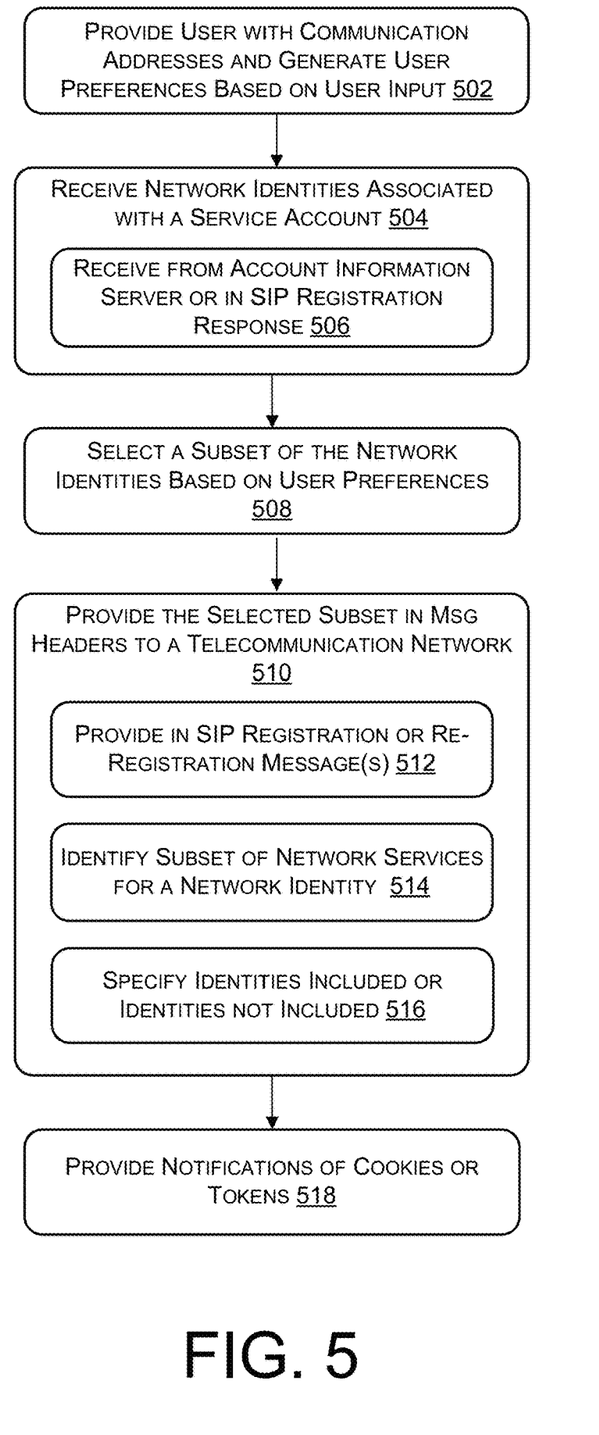
FIG. 5 illustrates an example process for selecting a subset of network identities of a service account for a user device based on preferences associated with that user device.
Figure 6:
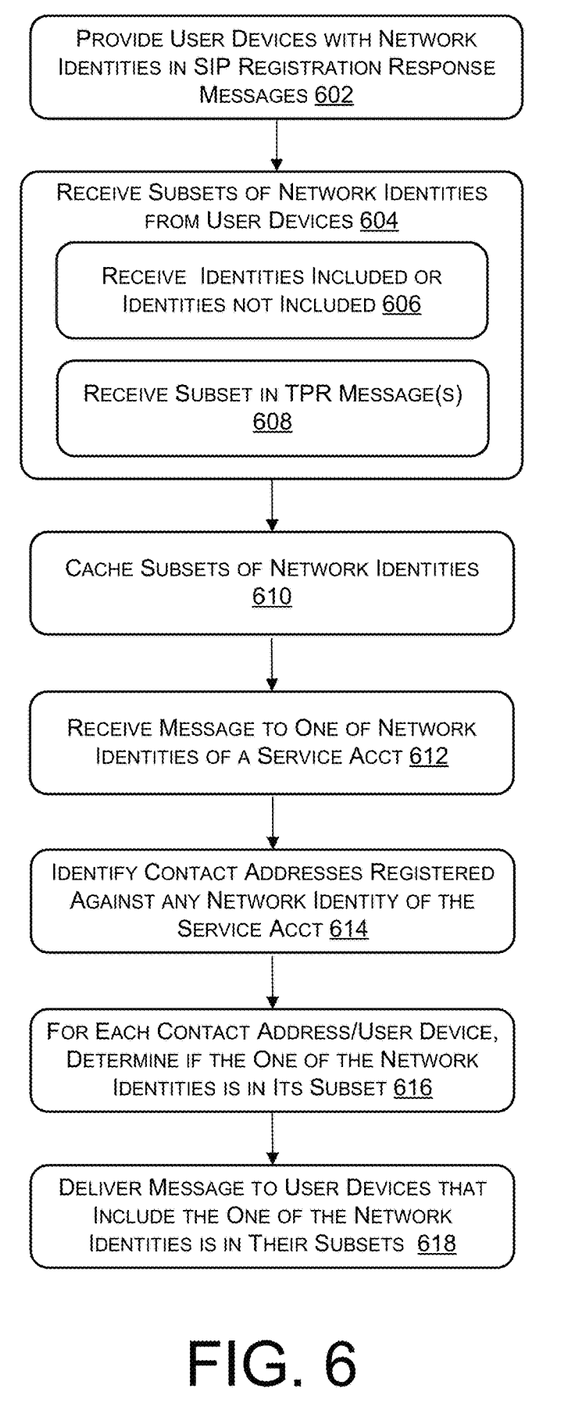
FIG. 6 illustrates an example process for delivering messages to user device(s) of a service account based on inclusion by those user device(s) of the message-recipient network identity in subset(s) of network identities respectively associated with the user device(s).
Figure 7:
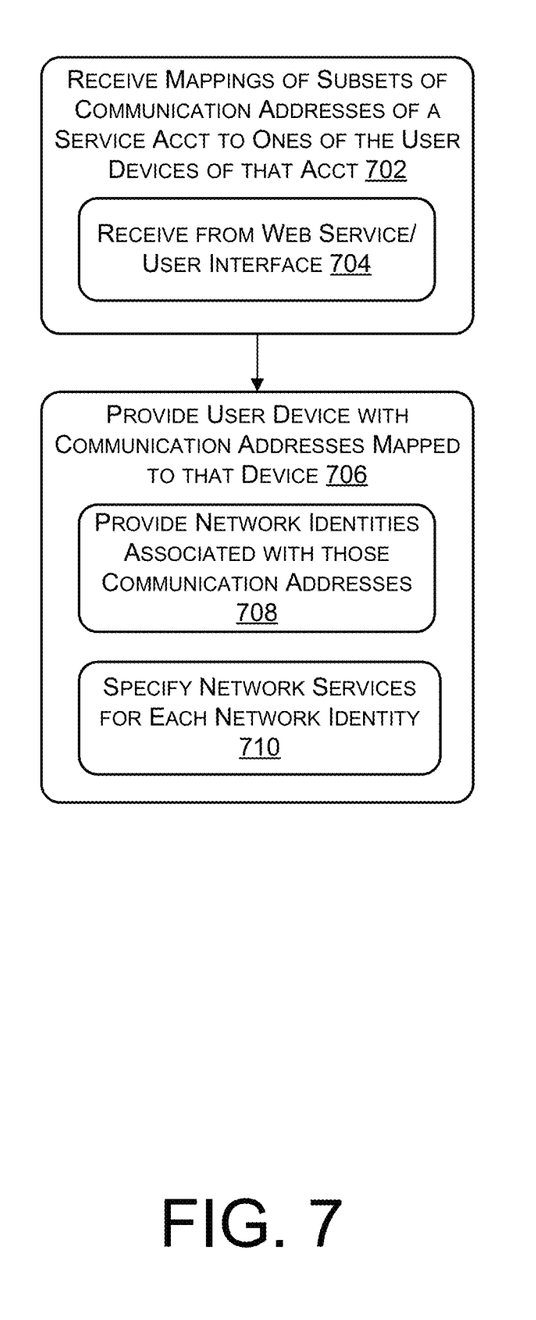
FIG. 7 illustrates an example process for receiving mappings of communication addresses to user devices and providing each user device with an indication of the communication address(es) mapped to it.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for selecting a subset of network identities of a service account for a user device based on preferences associated with that user device. Some or all of the operations shown in FIG. 5 may be performed by a SIP client of a user device. The process includes, at 502, providing, by the user device, a user with a set of communication addresses for which the user device may receive communications and generating user preferences based on user selection of one or more of the communication addresses.

At 504, the user device may receive identifications of multiple network identities associated with the service account, the multiple network identities including network identities associated with a plurality of different user devices. At 506, the receiving may include receiving the network identities from an account information server or from a telecommunication network device in a SIP registration response message. Such a SIP registration response may provide the identifications in a P-associated Uniform Resource Identifier (URI) header.

At 508, the user device may select a subset of the multiple network identities based on the user preferences. The preferences indicate network identities for which a user wishes the user device to receive communications. These network identities may be associated with the communication addresses selected at 502.

At 510, the user device may provide the selected subset in one or more headers of messages to a telecommunication network. The one or more headers may be one or more private headers. At 512, the providing may comprise providing the selected subset in SIP registration or SIP re-registration message(s). The subset may be included in SIP registration message(s) if the network identities were received, at 506, from an account information server. The subset may be included in SIP re-registration message(s) if the network identities were received, at 506, in SIP registration response message(s). At 514, the providing may include identifying a subset of network services available for a network identity. Identifying the network services may include specifying network services to be received at the user device for the network identity or network services not to be received at the user device for the network identity. At 516, the providing may include either specifying the network identities included in the subset or the network identities not included in the subset.

At 518, the user device may provide notifications of cookies or tokens.

FIG. 6 illustrates an example process for delivering messages to user device(s) of a service account based on inclusion by those user device(s) of the message-recipient network identity in subset(s) of network identities respectively associated with the user device(s). The process includes, at 602, providing, by a telecommunication network device, user devices associated with a service account with network identities associated with that service account in a SIP registration response message.

At 604, a telecommunication network device (e.g., P-CSCF 108, S-CSCF 110, or an application server 112) may receive subsets of the network identities from the respective user devices. Such subsets may be provided through SIP registration or SIP re-registration messages. At 606, the receiving may comprise receiving identifications of network identities included in the subset or identifications of network identities not included in the subset. At 608, when the telecommunication network device is an application server 112, the subsets may be received through TPR messages which include as attachments the subsets in SIP registration or SIP re-registration messages.

At 610, the telecommunication network device may cache the subsets of network identities in memory for a time period associated with a SIP communication session.

At 612, the telecommunication network device may receive a message directed to one of the network identities associated with the service account.

At 614, the telecommunication network device may identify one or more contact addresses registered against any of the plurality of network identities. Each of the one or more contact addresses may be associated with one of the user devices.

At 616, the telecommunication network device may, for each contact address, determine whether the one of the network identities is included among the subset of network identities received from the user device associated with that contact address.

At 618, the telecommunication network device may deliver, based on the determining at 616, the message to the user devices which included the one of the network identities in the respective subsets of the network identities provided by those user devices.

FIG. 7 illustrates an example process for receiving mappings of communication addresses to user devices and providing each user device with an indication of the communication address(es) mapped to it. The process includes, at 702, a computing device (such as account information server 118) receiving mappings of subsets of communication addresses of a service account to user devices of the service account. Each user device may be respectively mapped to one of the subsets of the communication addresses. At 704, the receiving may include receiving the mappings from a web service or user interface, which may enable a user to select different sets of communication addresses for different ones of his or her user devices.

At 706, the computing device may provide each user device with the subset of communication addresses mapped to that user device. At least two of the user devices may receive subsets of communication addresses which differ from each other. At 708, the providing may include providing network identities associated with those communication addresses. At 710, the providing may include specifying network services for each network identity.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A mobile device comprising:
a user interface;
one or more processors; and
one or more computer-readable media storing computer-executable instructions that, when executed, cause the one or more processors to perform operations comprising:
receiving, via the user interface, input to select communication addresses, individual ones of the communication addresses being associated with a corresponding user device of a plurality of user devices;
storing, in advance of any implicit registration set (IRS) being received, user preferences associated with the communication addresses;
receiving, from an account information server, an IRS;
selecting, as a subset of the IRS, network identities based on the user preferences;
transmitting the subset to a telecommunication network; and
receiving, based on network services associated with the subset, a message.

2. The mobile device of claim 1, wherein the network identities of the IRS and communication addresses associated with a service account.

3. The mobile device of claim 1, wherein:
the communication addresses are associated with a service account; and
the service account is associated with at least one of the plurality of user devices.

4. The mobile device of claim 3, wherein:
the communication addresses are associated with a service account; and
the service account is associated with a user device of the plurality of user devices, and the user device is a laptop computer.

5. The mobile device of claim 1, wherein:
the subset is selected via a website; and
the network services are selected via the website.

6. The mobile device of claim 1, wherein
the network services are identified based on Internet Protocol (IP) Multimedia Subsystem (IMS) communication service identifiers (ICSIs).

7. The mobile device of claim 1, wherein the IRS is received via a Session Initiation Protocol (SIP) registration response message.

8. The mobile device of claim 1, wherein the subset is transmitted via a SIP registration message.

9. A method comprising:
receiving, via a user interface of a mobile device, input to select communication addresses, individual ones of the communication addresses being associated with a corresponding user device of a plurality of user devices;
storing, in advance of any implicit registration set (IRS) being received by the mobile device, user preferences associated with the communication addresses;
receiving, by the mobile device and from an account information server, an IRS;
selecting, by the mobile device and as a subset of the IRS, network identities based on the user preferences;
transmitting, by the mobile device, the subset to a telecommunication network; and receiving, by the mobile device and based on network services associated with the subset, a message.

10. The method of claim 9, wherein the network identities of the IRS and the communication addresses are associated with a service account.

11. The method of claim 9, wherein:
the communication addresses are associated with a service account; and
the service account is associated with at least one of the plurality of user devices.

12. The method of claim 9, wherein:
the communication addresses are associated with a service account; and
the service account is associated with a user device of the plurality of user devices, and the user device is a laptop computer.

13. The method of claim 9, wherein:
the subset is selected via a website; and
the network services are selected via the website.

14. The method of claim 9, wherein:
the network services are identified based on Internet Protocol (IP) Multimedia Subsystem (IMS) communication service identifiers (ICSIs).

15. The method of claim 9, wherein the network identities are received via a Session Initiation Protocol (SIP) registration response message.

16. A non-transitory computer-readable medium comprising executable instructions stored thereon which, when executed by a mobile device, cause the mobile device to perform operations comprising:
receiving, via a user interface of the mobile device, input to select of communication addresses, individual ones of the communication addresses being associated with a corresponding user device of a plurality of user devices;
storing, in advance of any implicit registration set (IRS) being received by the mobile device, user preferences associated with the communication addresses;
receiving, by the mobile device and from an account information server, an IRS;
selecting, by the mobile device and as a subset of the IRS, network identities based on the user preferences;
transmitting, by the mobile device, the subset to a telecommunication network; and
receiving, by the mobile device and based on network services associated with the subset, a message.

17. The non-transitory computer-readable medium of claim 16, wherein the network identities of the IRS and the communication addresses are associated with a service account.

18. The non-transitory computer-readable medium of claim 16, wherein:
the communication addresses are associated with a service account; and
the service account is associated with at least one of the plurality of user devices.

19. The non-transitory computer-readable medium of claim 16, wherein:
the communication addresses are associated with a service account; and
the service account is associated with a user device of the plurality of user devices, and the user device is a laptop computer.

20. The non-transitory computer-readable medium of claim 16, wherein:
the subset is selected via a website; and
the network services are selected via the website.

* * * * *